United States Patent

McBrearty et al.

(10) Patent No.: US 6,598,072 B1
(45) Date of Patent: Jul. 22, 2003

(54) SYSTEM FOR PRECLUDING REPETITIVE ACCESSING OF WEB PAGES IN A SEQUENCE OF LINKED WEB PAGES ACCESSED FROM THE WORLD WIDE WEB THROUGH A WEB BROWSER AT A WEB RECEIVING DISPLAY STATION

(75) Inventors: Gerald Francis McBrearty, Austin, TX (US); Shawn Patrick Mullen, Buda, TX (US); Johnny Meng-Han Shieh, Austin, TX (US); Guha Prasad Venkataraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/453,250

(22) Filed: Dec. 2, 1999

(51) Int. Cl.$^7$ ............................................. G06F 13/00
(52) U.S. Cl. ..................... 709/203; 709/217; 709/218
(58) Field of Search ............................... 709/203, 217, 709/218, 219; 707/501.1, 501, 513

(56) References Cited

U.S. PATENT DOCUMENTS

| | | | | |
|---|---|---|---|---|
| 6,081,805 A | * | 6/2000 | Guha | 707/2 |
| 6,131,110 A | * | 10/2000 | Bates et al. | 709/203 |
| 6,253,229 B1 | * | 6/2001 | Nielsen et al. | 709/203 |
| 6,275,820 B1 | * | 8/2001 | Navin-Chandra et al. | 707/10 |
| 6,324,552 B1 | * | 11/2001 | Chang et al. | 707/501.1 |
| 6,338,075 B2 | * | 1/2002 | Fukuda | 345/760 |
| 6,370,527 B1 | * | 4/2002 | Singhal | 707/6 |

\* cited by examiner

*Primary Examiner*—Krisna Lim
*Assistant Examiner*—Mareisha N. Winters
(74) *Attorney, Agent, or Firm*—Julius B. Kraft; Thomas E. Tyson; Volel Emile

(57) ABSTRACT

In a search session through a browser for pages on the World Wide Web (Web), a system for precluding repetitive accessing of documents linked to hyperlinks in a plurality of hypertext documents. The system is directed to a Web communication network with user access via a plurality of data processor controlled interactive receiving display stations for displaying received hypertext documents of at least one display page containing text, images and a plurality of embedded hyperlinks, each hyperlink being user selectable to access and display a respective linked hypertext document. In addition to precluding hyperlinks which had been activated in previous pages and/or hyperlinks which have been discounted merely by having been present in previous pages, the Web browser may be setup to permit the user to specifically discount individual hyperlinks or groups of hyperlinks. Also, the Web browser may be setup to preclude repetitive hyperlinks in subsequent Web pages from searches from different search engines.

The basic system comprises search means for locating and providing to receiving display stations hypertext documents, combined with a Web browsing system operatively associated with the receiving display station including means for querying said search means for hypertext documents, means for activating hyperlinks to linked documents and means responsive to said activating means for accessing the linked documents. The browser also has user interactive means for discounting hyperlinks in received Web documents, and means precluding the accessing of any document linked to previously discounted hyperlinks.

24 Claims, 6 Drawing Sheets

SYSTEM FOR PRECLUDING REPETITIVE ACCESSING OF WEB PAGES IN A SEQUENCE OF LINKED WEB PAGES ACCESSED FROM THE WORLD WIDE WEB THROUGH A WEB BROWSER AT A WEB RECEIVING DISPLAY STATION

CROSS-REFERENCE TO RELATED COPENDING PATENT APPLICATIONS

The following patent application, assigned to the assignee of the present invention and filed concurrently herewith, covers subject matter related to the subject matter of the present invention: A SYSTEM FOR PRECLUDING REPETITIVE ACCESSING OF WEB PAGES IN A SEQUENCE OF LINKED WEB PAGES ACCESSED FROM THE WORLD WIDE WEB THROUGH SEARCHING, McBrearty et al.,

TECHNICAL FIELD

The present invention relates to computer managed communication networks such as the World Wide Web (Web) and, particularly, to systems, processes and programs for reducing users' time spent in searching by reducing the accessing of previously viewed documents.

BACKGROUND OF RELATED ART

The 1990's decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct hyperlinks between Web pages embedded in such Web pages. This even further exploded the use of the Internet or Web. It was now possible for the Web browser or wanderer to spend literally hours going through document after document in often less than productive excursions through the Web. These excursions often strained the users' time and resources. A significant source of this drain is in the Web page itself (the basic document page of the Web).

In the case of Web pages, we do not have the situation of a relatively small group of professional designers working out the human factors; rather, in the era of the Web, anyone and everyone can design a Web page. As a result, Web pages are frequently setup and designed in an eclectic manner. Often Web pages are setup through loose business, professional, social and educational configurations with general trade or public input of Web pages. The names or identifiers selected for the hyperlinks by Web pages hosts or authors are often very similar to each other. As a result, the user going through one or a series of Web searches or browses will find it virtually impossible to recognize the identifiers or hyperlinks to pages which have already been accessed through previous Web pages. Thus, the user may spend considerable time going around in circles.

The above cross-referenced copending application, A SYSTEM FOR PRECLUDING REPETITIVE ACCESSING OF WEB PAGES IN A SEQUENCE OF LINKED WEB PAGES ACCESSED FROM THE WORLD WIDE WEB THROUGH SEARCHING, provides a simple and effective system through which the Web user may avoid the repetitive accessing of most of the previously accessed Web documents in a single or a sequence of Web searches. It provides a system for precluding repetitive accessing of documents linked to hyperlinks in a plurality of hypertext documents. The basic system comprises conventional means at a Web page receiving display station for activating hyperlinks to linked documents in combination with means responsive to such activating means for accessing said linked documents. Means are provided for keeping track of each activated hyperlink in each received or accessed document together with means for precluding the accessing of any document linked to a previously activated or discounted hyperlink. A hyperlink is considered to be discounted if it has been in a previous Web page in the sequence and already been activated to access a linked document. Alternately, the search system may discount all hyperlinks that have been in a previous document in the sequence and, thus, presented to the user on the display. All such previously accessed and/or discounted documents are included in a list cached conveniently at the search engine level. Then, in all subsequent documents developed through the search, a compare of hyperlinks is made to the links listed in the cache and all listed hyperlinks are precluded from being again presented in subsequent document pages.

SUMMARY OF THE PRESENT INVENTION

The present invention involves the further recognition of carrying out the tracking and listing of previously activated hyperlinks or discounted hyperlinks at the Web browser application or system and the Web receiving display station gives the user a much wider variety of options in handling of repetitive hyperlinks from previously accessed Web pages. In addition to precluding hyperlinks which had been activated in previous pages and/or hyperlinks which have been discounted merely by having been present in previous pages, the Web browser may be setup to permit the user to specifically discount individual hyperlinks or groups of hyperlinks. Also, the Web browser may be setup to preclude repetitive hyperlinks in subsequent Web pages from searches from different search engines.

The present invention is implemented in a communication network such as the Web or Internet (used synonymously) with user access via a plurality of data processor controlled interactive receiving display stations for displaying received hypertext documents of at least one display page containing text, images and a plurality of embedded hyperlinks, each hyperlink being user selectable to access and display a respective linked hypertext document (Web page). It provides a system for precluding repetitive accessing of documents linked to hyperlinks in a plurality of hypertext documents.

The basic system comprises search means for locating and providing to receiving display stations hypertext documents, combined with a Web browsing system operatively associated with the receiving display station, including means for querying said search means for hypertext documents, means for activating hyperlinks to linked documents and means responsive to said activating means for accessing the linked documents. The browser also includes user interactive means for discounting hyperlinks in received Web documents, and means for precluding the accessing of any document linked to a previously discounted hyperlink.

The user may setup the system to operate on a single Web search or a sequence of such searches or sessions. The browser application may be setup to handle such a sequence of searches made on several different search engines. Once a hyperlink is activated or discounted in a tracked Web page, the setup precludes the accessing of documents linked to previously activated or discounted hyperlinks contained in subsequently accessed documents. When the previously discounted or activated hyperlinks are part of the text or image content of said subsequently accessed document, then accessing of linked documents is precluded by rendering the previously activated hyperlinks inactivatable in the subsequently accessed documents without affecting the text or image value of said hyperlinks. If it turns out that any subsequently accessed Web pages or documents contain only previously discounted or accessed hyperlinks, then the browser system may not present such pages or documents to the user.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
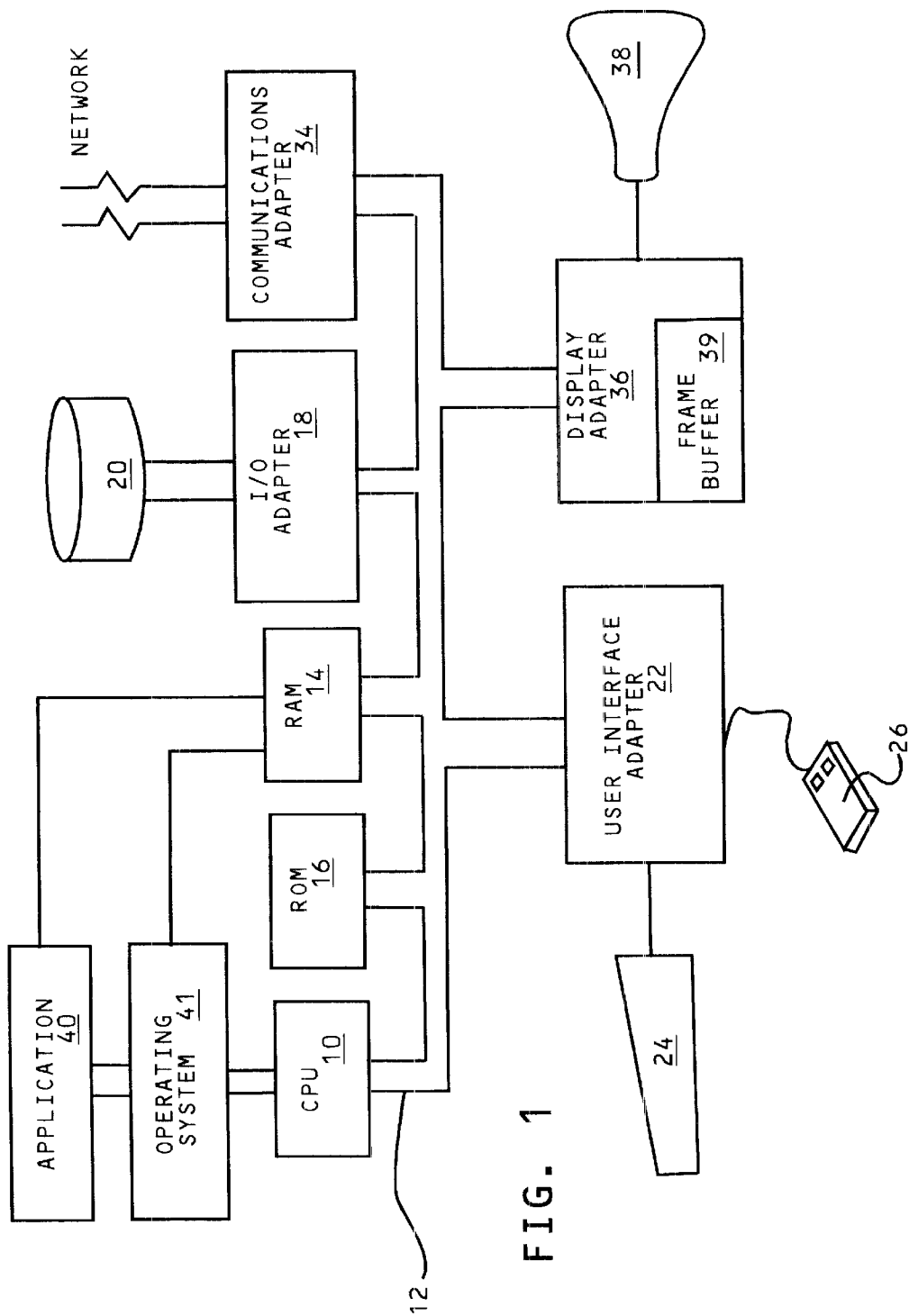
FIG. 1 is a block diagram of a data processing system including a central processing unit and network connections via a communications adapter which is capable of functioning as a user interactive Web station for receiving and transmitting Web pages.

Referring to FIG. 1, a typical data processing terminal is shown which may function as the computer controlled network terminals or Web display stations used for receiving Web pages, for requesting Web searches and for Web browsing.

A central processing unit (CPU) 10, such as one of the PC microprocessors or workstations, e.g. RISC System/6000 (™) (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000(™) operating system available from IBM; Microsoft's Windows 98(™) or Windows NT(™), as well as UNIX and AIX operating systems. Application programs 40, controlled by the system, are moved into and out of the main memory random access memory (RAM) 14. These programs include the programs of the present invention for the precluding of repetitive accessing of Web documents to be subsequently described in combination with any conventional Web browser, such as the Netscape Navigator 3.0(™) or Microsoft's Internet Explorer(™). A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or a wide area network (WAN), which includes, of course, the Web or Internet. The latter two terms are meant to be generally interchangeable ace are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web pages. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since a major aspect of the present invention is directed to Web pages, transmitted over global networks, such as the Web or Internet, an understanding of networks and their operating principles would be helpful. We will not go into great detail in describing the networks to which the present invention is applicable. For details on Web nodes, objects and links, reference is made to the text, *Mastering the Internet,* G. H. Cady et al., published by Sybex Inc., Alameda, Calif., 1996; or the text, *Internet: The Complete Reference, Millennium Edition,* Margaret Young et al., Osborne/McGraw-Hill, Berkeley, Calif., 1999.

Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. Web documents are conventionally implemented in HTML language, which is described in detail in the text entitled *Just Java,* van der Linden, 1997, SunSoft Press, particularly at Chapter 7, pp. 249–268, dealing with the handling of Web pages; and also in the above-referenced *Mastering the Internet,* particularly pp. 637–642, on HTML in the formation of Web pages. In addition, aspects of this invention will involve Web browsers. A general and comprehensive description of browsers may be found in the above-mentioned *Mastering the Internet* text at pp. 291–313. More detailed browser descriptions may be found in the above-mentioned *Internet: The Complete Reference, Millennium Edition* text: Chapter 19, pp. 419–454, on the Netscape Navigator; Chapter 20, pp. 455–494, on the Microsoft Internet Explorer; and Chapter 21, pp. 495–512, covering Lynx, Opera and other browsers.

The invention will also involve the use of search engines for searching. As described in the *Internet: The Complete Reference, Milleniun Edition* text, pages 395 and 522–535, search engines use keywords and phrases to query the Web for desired subject matter. Usually the keywords are combined with some of the basic Boolean operators, i.e. AND, OR and NOT, in designing Web queries. Each search engine has its own well developed syntax or rules for combining such Boolean operators with the keywords to conduct the searches. The search engine is a database application that retrieves information according to its own syntax. The search engine usually uses a search agent called a "spider" that looks for information on Web pages. Such information is indexed and stored in a vast database. In carrying out its search, the search engine looks through the database for matches to keywords subject to the engine syntax. The search engine then presents to the user a list of the Web pages it determines to be closest to the requested query. Some significant search engines are: AltaVista, Infoseek, Lycos, Magellan, Webcrawler and Yahoo.

Figure 2:
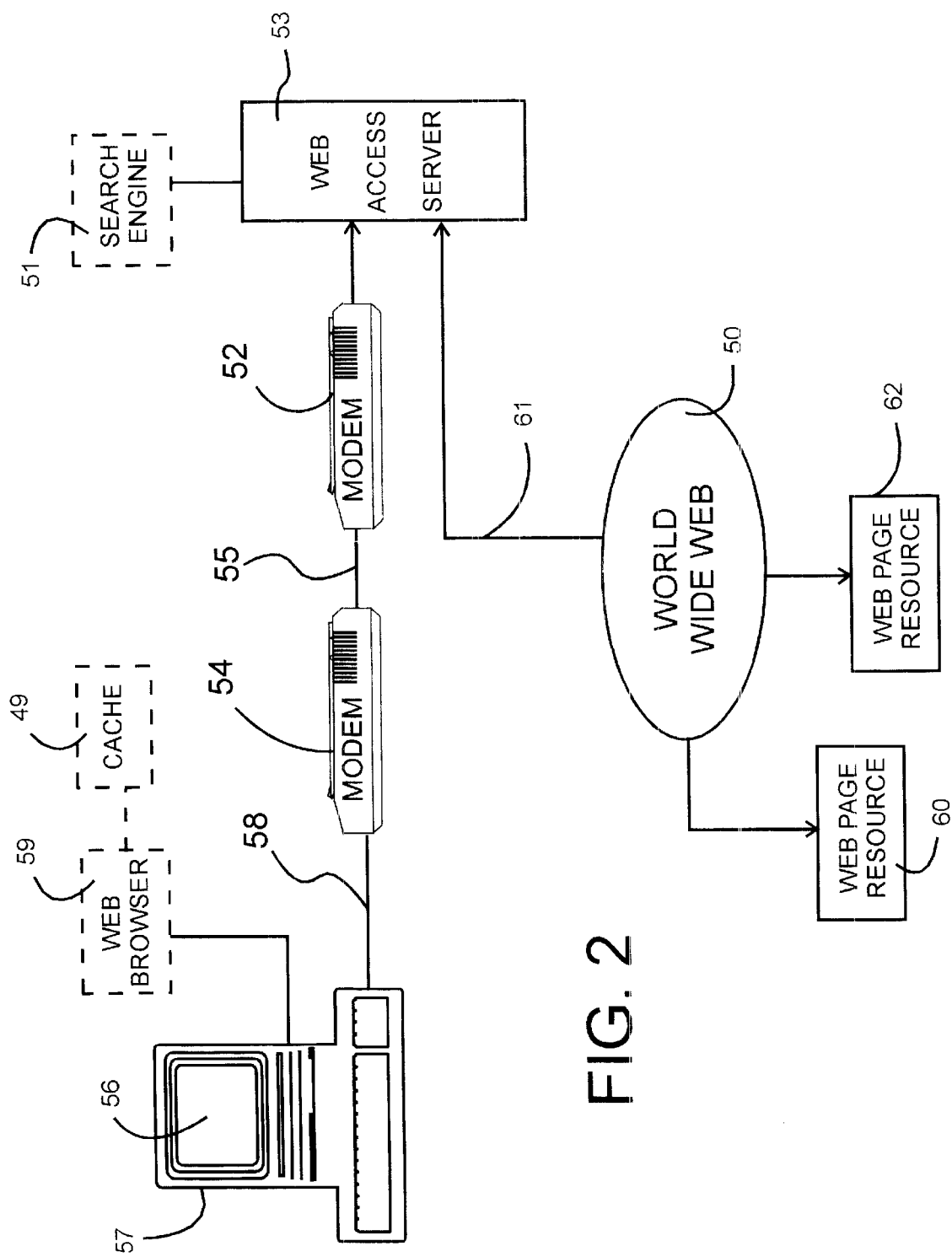
FIG. 2 is a generalized diagrammatic view of a Web portion showing how the Web may be accessed to and from the Web stations through browser applications for the requesting Web pages and for tracking and precluding previously activated/discounted hyperlinks to Web pages.

A generalized diagram of a portion of the Internet, which the computer controlled display terminal 57 used for Web page receiving during searching or browsing, is connected as shown in FIG. 2. Computer display terminal 57 may be implemented by the computer system setup in FIG. 1 and connection 58 (FIG. 2) is the network connection shown in FIG. 1. For purposes of the present embodiment, computer 57 serves as a Web display station and has received displayed Web page 56 which is one of a sequence of Web pages containing an embedded hyperlinks to other Web pages.

Reference may be made to the above-mentioned *Mastering the Internet,* pp. 136–147, for typical connections between local display stations to the Web via network servers, any of which may be used to implement the system on which this invention is used. The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the client terminal 57 through a normal dial-up telephone linkage 58 via modem 54, telephone line 55 and modem 52. The HTML file representative of the Web page 56 has been downloaded to display terminal 57 through Web access server 53 via the telephone line linkages from server 53, which may have accessed them from the Internet 50 via linkage 61. The Web browser program 59 operates within the display terminals 57 computer to control the communication with the Web access server 53 to thereby download and display the accessed Web pages 56 on terminal 57. The Web access server 53 uses one of the previously described search engines to access via the Web 50 the desired sequence of Web pages from appropriate Web resources such as databases 60 and 62.

With this setup, the present invention which will be subsequently described in greater detail with respect to FIGS. 3 through 6 may be carried out using Web browser 59 and associated cache 49. As search engine 51 accesses the sequence of Web pages and provides such pages to the user at terminal 57, the overall search system may operate in one of two major modes selectable by the user through the browser, as will be subsequently described with respect to FIGS. 3 through 6. The browser may be setup to track and discount all hyperlinks in all documents provided to the user through the browser irrespective of whether the user selects or activates such links to obtain a linked document. Thus, once a hyperlink in a search or session is presented to a user, it will never be presented in any subsequent document. Alternately, the user may select that only the hyperlinks in the pages that have been activated to access a linked document will be precluded from subsequent pages presented to the user through the browser, in which case he will not need to subsequently activate them again. Thus, the searching is progressive, i.e. hyperlinks activated by, or at least presented to, the user in previous Web documents are precluded from subsequent documents. The progressive searching advantages as set forth above are readily embodied and practiced at the browser 59 in combination with its cache 49. Individualized searching of hypertext Web documents, as well as the caching and tracking of presented hyperlinks over a variety of combined searches may be more readily applied to specific user needs if the caching and tracking of the hyperlinks is done at this browser level.

Figure 3:
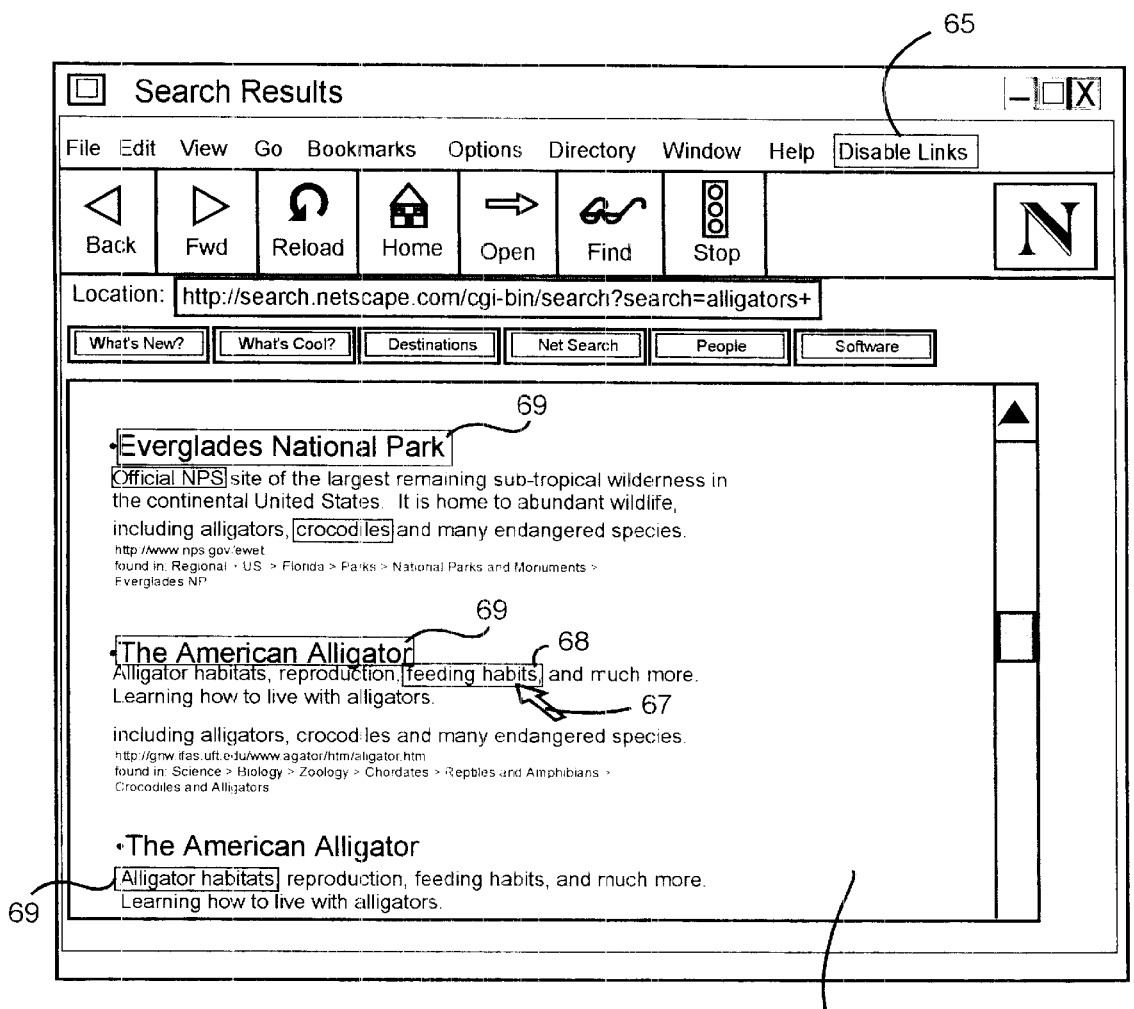
FIG. 3 is a diagrammatic view of a Web page displayed through a browser at a receiving display station setup to illustrate the hyperlinks disable or discount function provided through the present invention.

The display interface to this browser level setup will be illustrated with respect to the illustrative display screen shown in FIG. 3. A web page 66 has been accessed at a receiving display station. For convenience in illustration, hyperlinks 68 and 69 are shown enclosed by rectangles, the browser interface through which the page was accessed may highlight the hyperlinks in any conventional manner, e.g. by lighting or color. The browser may be preset to automatically cache all of the hyperlinks on the page or to cache only the hyperlinks which the user will select or activate. In either case, the cached hyperlinks will be considered to be discounted and, thus, will be precluded from appearing as hyperlinks in any subsequent Web pages accessed through the browser. In addition to or in place of the automatic caching, the browser is setup with a Disable Links function button 65. When button 65 is clicked, FIG. 4, a disable links menu 70 drops down which gives the user some additional disable options. The "Stale" option is shown as the default option, i.e. the system is now setup to only cache the hyperlinks which will be activated to access their linked document and become stale or used. The other options which the user may point to and select are "All", in which case all of the links 68 and 69 will become cached irrespective of whether they have been selected, or the "Point to" option, in which case the user may then point to the hyperlinks which he wishes to be cached and, thus, subsequently disabled or precluded. An example is that in this point to state, when the user points to hyperlink 68 with cursor 67, that hyperlink will be cached. The cached hyperlinks will be stored in the cache 49 for browser 59 (FIG. 2) and will be precluded in all subsequent pages or documents accessed through the browser (as will be described in greater detail hereinafter with respect to FIGS. 5 and 6). It should be noted that if the hyperlinks to be precluded have a textual function in the subsequent pages (such as links 68 and 69 have in page 66), then the text of the hyperlinks will still be part of the page as ordinary text, only the highlighting will be gone.

Also, the browser may be so setup that if a subsequent page has all of its hyperlinks precluded, then the browser will not display the page to the user.

Figure 4:
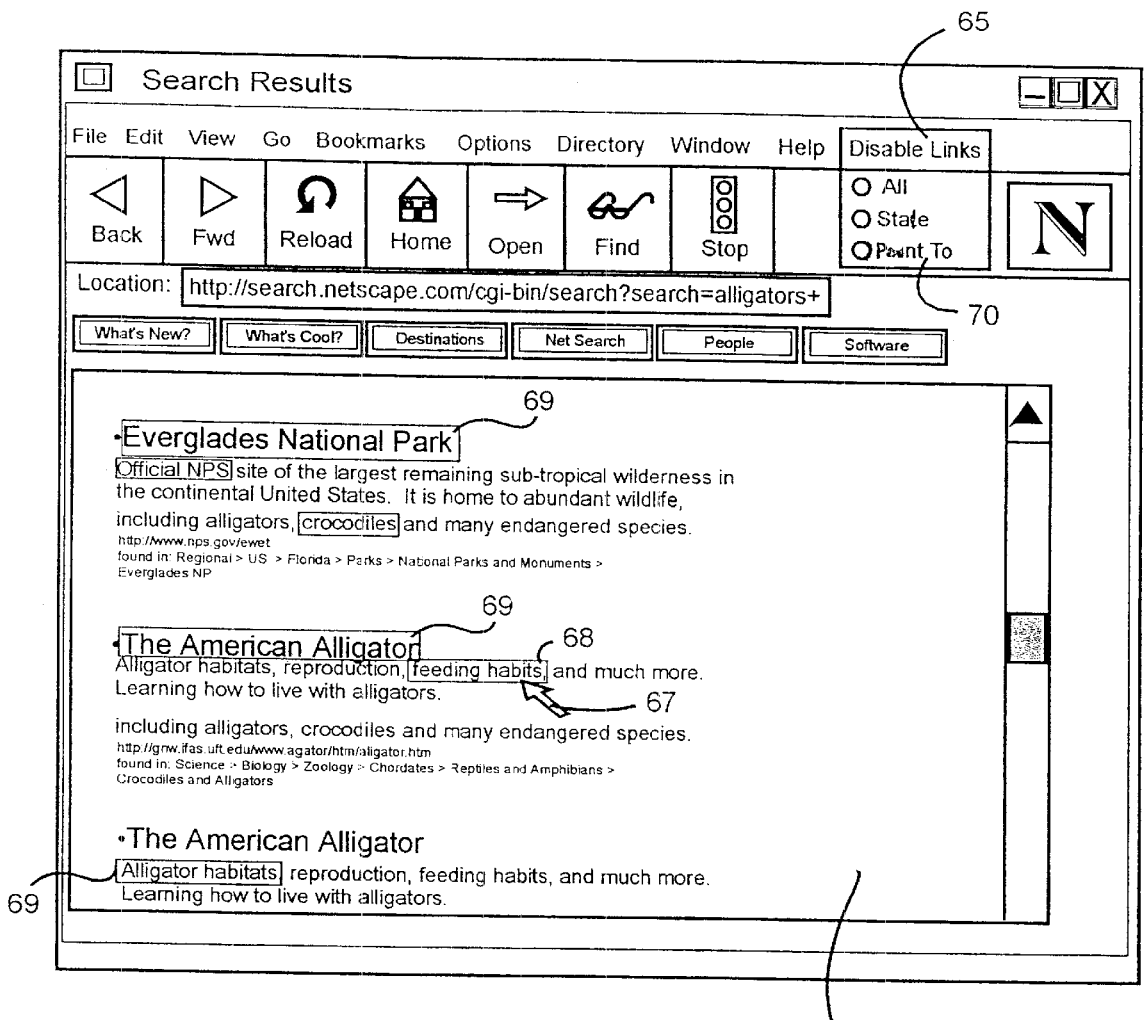
FIG. 4 is the diagrammatic display view of FIG. 3 after the user has triggered and brought down a menu of disable options.
Figure 5:
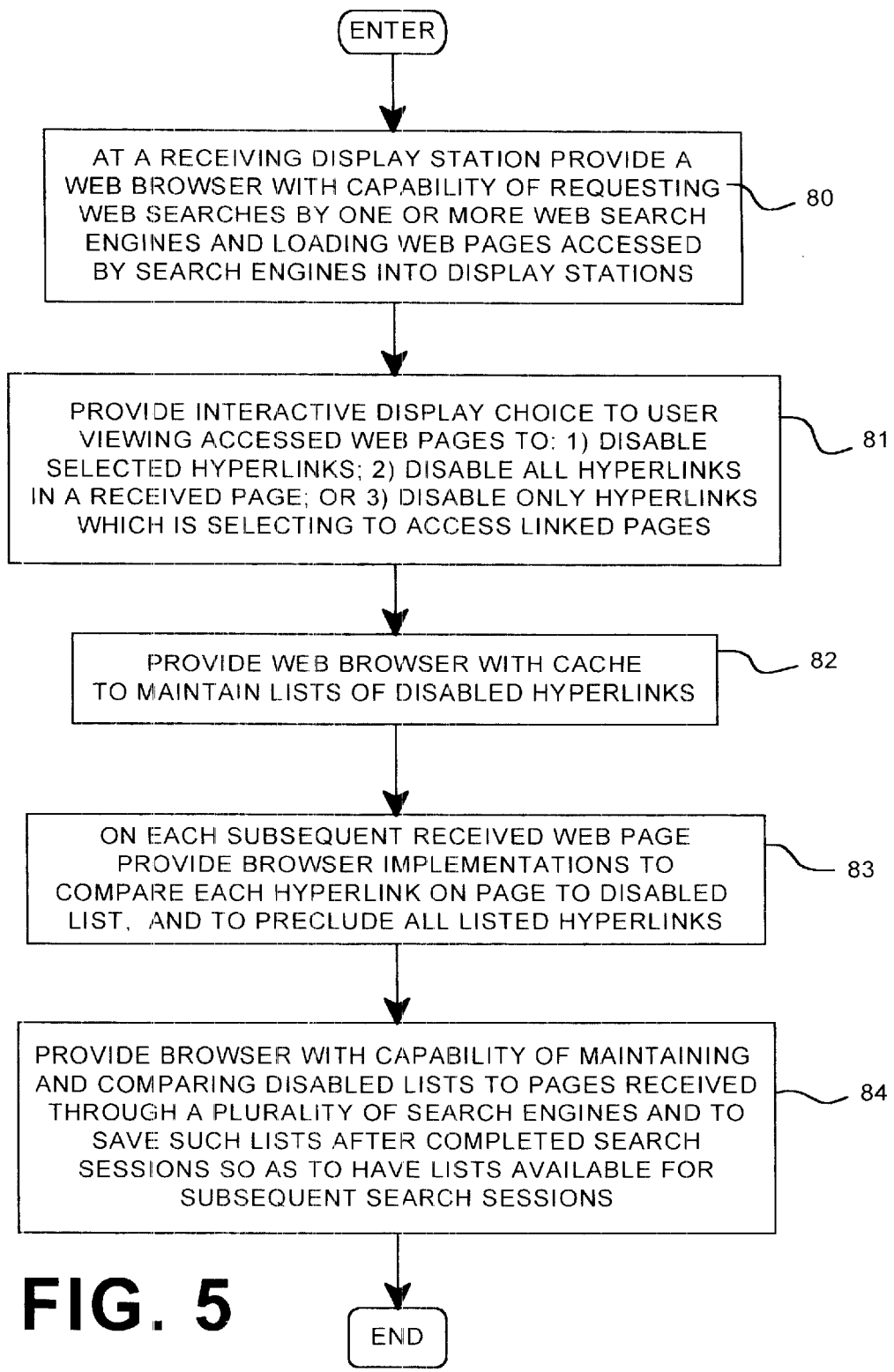
FIG. 5 is an illustrative flowchart describing the setting up of the process needed in the browser application for precluding repetitive accessing of documents linked to hyperlinks in a plurality of hypertext documents.

FIG. 5 is a flowchart showing the development of a process according to the present invention for precluding the accessing of documents linked to hyperlinks in a plurality of hypertext documents. Most of the programming functions in the process of FIG. 5 have already been described in general with respect to FIGS. 2 through 4. A Web browser is provided at a receiving display station on the Web for accessing Web pages in the conventional manner and loading them at the display station, step 80. The Web browser has the capability of requesting searches from one or more search engines available through the Web. The received Web pages will function as requesting Web pages for the searching of the Web to be subsequently described. The user will be setup with an interactive display, step 81, through which he has the disable options shown in FIG. 4: 1) disable all hyperlinks in a received page; 2) disable all hyperlinks on the page; or 3) disable only the activated or used hyperlinks. The browser is provided with a cache for maintaining lists of hyperlinks disabled in one or more related or independent sessions, step 82. With respect to each subsequently received Web page, the browser is provided with an implementation to compare each hyperlink on the page to the lists in the cache, and to preclude all listed hyperlinks, step 83. The browser is provided with the capability of maintaining the cached lists and comparing such disabled hyperlink lists to pages received from a variety of search engines, and also to save such lists beyond completed search sessions so as to have such lists available for subsequent search sessions, step 84.

Figure 6:
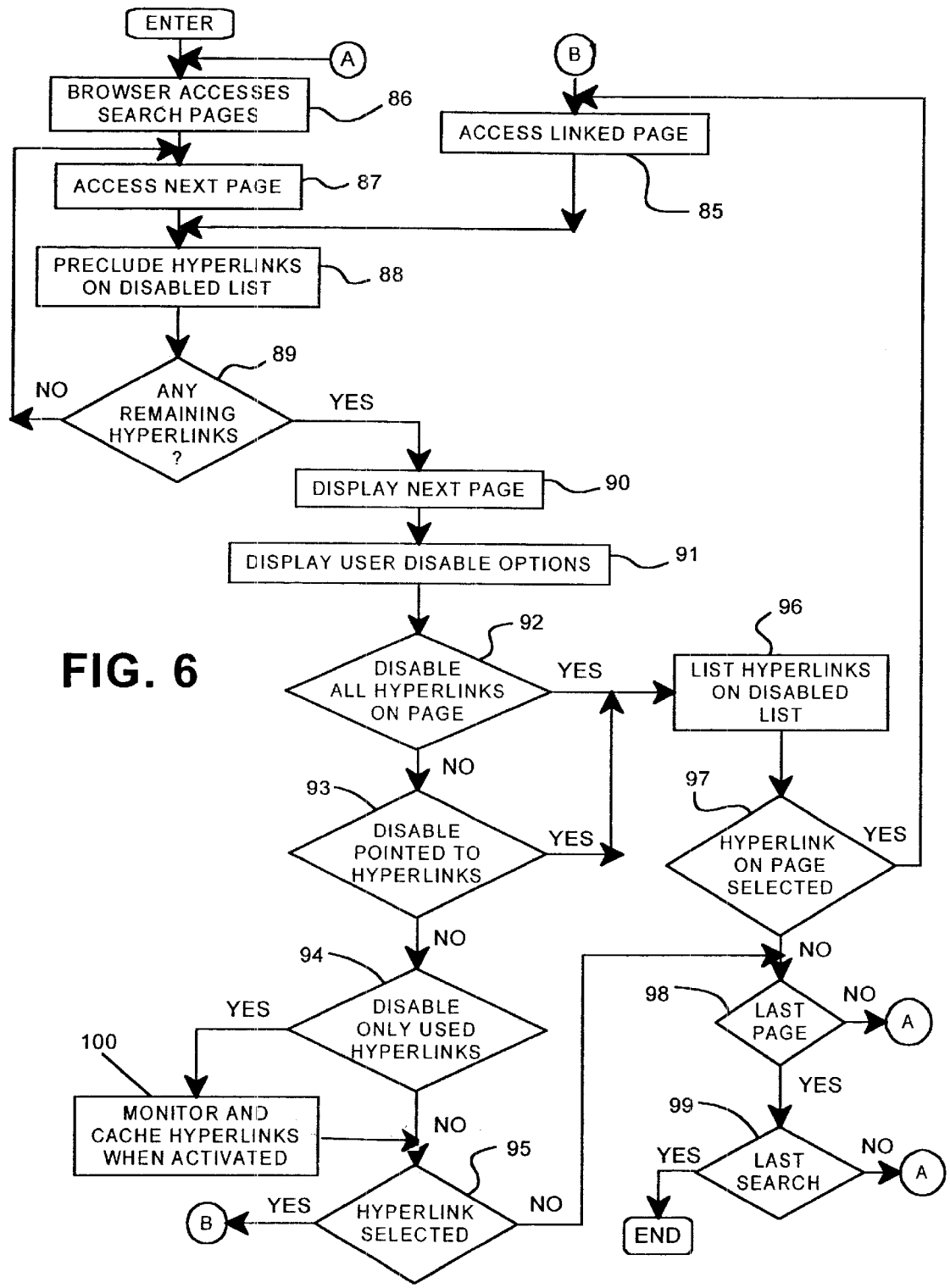
FIG. 6 is a flowchart of an illustrative run of the process setup in FIG. 5.

The running of the process setup in FIG. 5 and adescribed in connection with FIGS. 2 through 4 will now be described with respect to the flowchart of FIG. 6. Let us assume that we are in a search session through the browser. The flowchart represents some steps in a routine which will illustrate the operation of the invention. The browser accesses the pages found by the search engine, step 86. The next Web page is accessed, step 87. A comparison is made to the cached list of discounted or disabled hyperlinks, step 88, and the listed hyperlinks are precluded. Then, decision step 89, a determination is made as to whether any hyperlinks remain on the page. If No, then the process is returned to step 87 and the next page is accessed. If Yes, then step 90, the next page is displayed. Before the user selects hyperlinks to access other Web pages, he may change or use his default disable options by bringing down menu 70 (FIG. 4), step 91. He may chose Yes in decision step 92 to disable all hyperlinks on the page, then the process goes to step 96 and all hyperlinks on the page are listed on the cache list. If step 92 is No, then he may choose, step 93, to disable all pointed to hyperlinks; if Yes, then the process again goes to step 96 and the pointed to hyperlinks on the page are listed on the cache list. If No, then a determination is made, step 94, as to whether the user has selected to disable only used or activated hyperlinks. If Yes, the process is setup to monitor and cache hyperlinks when they are activated to access pages, step 100. The process then proceeds to step 95 where a determination is made as to whether a hyperlink has been selected; step 95 also follows a No decision from step 94 which indicates that selection of links need not be monitored and cached. If the determination from step 95 is Yes, a hyperlink has been selected or activated, then the process proceeds to step 85 via branch "B", the linked page is accessed and the process proceeds as described above. Likewise, after step 96, the process proceeds to step 97 where a determination is also made as to whether a hyperlink has been selected. If the determination from step 97 is Yes, a hyperlink has been selected or activated, then the process also proceeds to step 85 where the linked page is accessed and the process proceeds as described above. If either the decision from steps 95 and 97 is No, then the process proceeds to step 98 where a determination is made as to whether this is the last page. If No, the process returns to step 86 via branch "A", and the browser accesses more pages from the particular search where the process proceeds as described above. If the decision from step 98 is Yes, it is the last page, then a determination is made as to whether this is the last search, step 99. If Yes, the process is exited. If No, then there are pages from another search and the process proceeds to step 86 via branch "A" and the browser accesses more pages from the particular search, after which the process proceeds as described above.

One of the preferred implementations of the present invention is in application program 40 made up of programming steps or instructions resident in RAM 14, FIG. 1, of a Web station during various Web operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a World Wide Web (Web) communication network with user access via a plurality of data processor controlled interactive receiving display stations for displaying received hypertext documents of at least one display page containing text, images and a plurality of embedded hyperlinks, each hyperlink being user selectable to access and display a respective linked hypertext document, a system for precluding repetitive accessing of documents linked to hyperlinks in a plurality of hypertext documents comprising:

search means for locating and providing to one of said receiving display stations hypertext documents, and
   a Web browsing system operatively associated with said one receiving display station including:
      means for querying said search means for hypertext documents,
      means for activating hyperlinks to linked documents,
      means responsive to said activating means for accessing said linked documents,
      user interactive means for discounting user selected hyperlinks in received Web documents, and
      means for precluding the accessing of any document linked to a previously discounted hyperlink.

2. The system of claim 1 wherein said search means comprise a Web search engine.

3. The system of claim 2 wherein said search means comprise a plurality of search engines, each conducting a separate search.

4. The system of claim 3 wherein said means for precluding comprise:
    means for listing each discounted hyperlink in Web documents from a search conducted by one of said plurality of search engines, and
    means for precluding the accessing of documents linked to said listed hyperlinks contained in Web documents subsequently accessed from a search conducted by another of said plurality of search engines.

5. The system of claim 1 wherein said means for precluding comprise:
    means for listing each discounted hyperlink, and
    means for precluding the accessing of documents linked to said listed hyperlinks contained in subsequently accessed documents.

6. In a Web communication network with user access via a plurality of data processor controlled interactive receiving display stations for displaying received hypertext documents of at least one display page containing text, images and a plurality of embedded hyperlinks, each hyperlink being user selectable to access and display a respective linked hypertext document, a method for precluding repetitive accessing of documents linked to hyperlinks in a plurality of hypertext documents comprising:
    searching the Web to locate and provide to one of receiving display stations hypertext documents, and
    a Web browsing method operatively associated with said one receiving display station including the steps of:
        providing to said searching step queries for locating hypertext documents,
        activating hyperlinks in located documents to access and receive linked documents,
        discounting user selected hyperlinks in received Web documents, and
        precluding the accessing of any document linked to a previously discounted hyperlink.

7. The method of claim 6 wherein said search step is carried out by an established Web search method.

8. The method of claim 7 wherein said search step is carried out by a plurality of established Web search methods each conducting a separate search.

9. The method of claim 8 wherein said precluding step comprises:
    listing each discounted hyperlink in Web documents from a search conducted by one of said plurality of search methods, and
    precluding the accessing of documents linked to said listed hyperlinks contained in Web documents subsequently accessed from a search conducted by another of said plurality of search methods.

10. The method of claim 6 wherein said precluding step comprises:
    listing each discounted hyperlink, and
    precluding the accessing of documents linked to said listed hyperlinks contained in subsequently accessed documents.

11. A computer program having code recorded on a computer readable medium for precluding repetitive accessing of documents linked to hyperlinks in a plurality of hypertext documents in a Web communication network with user access via a plurality of data processor controlled interactive receiving display stations for displaying received hypertext documents of at least one display page containing text, images and a plurality of embedded hyperlinks, each hyperlink being user selectable to access and display a respective linked hypertext document, said program comprising:
    search means for locating and providing to one of receiving display stations hypertext documents, and
    a Web browsing program operatively associated with said one receiving display station including:
        means for querying said search means for hypertext documents,
        means for activating hyperlinks to linked documents,
        means responsive to said activating means for accessing said linked documents,
        user interactive means for discounting user selected hyperlinks in received Web documents, and
        means for precluding the accessing of any document linked to a previously discounted hyperlink.

12. The computer program of claim 11 wherein said search means comprise a Web search engine.

13. The computer program of claim 12 wherein said search means comprise a plurality of search engines, each conducting a separate search.

14. The computer program of claim 12 wherein said means for precluding comprise:
    means for listing each discounted hyperlink in Web documents from a search conducted by one of said plurality of search engines, and
    means for precluding the accessing of documents linked to said listed hyperlinks contained in Web documents subsequently accessed from a search conducted by another of said plurality of search engines.

15. The computer program of claim 11 wherein said means for precluding comprise:
    means for listing each discounted hyperlink, and
    means for precluding the accessing of documents linked to said listed hyperlinks contained in subsequently accessed documents.

16. A Web communication network comprising:
    a receiving display station,
    means for searching the Web to provide hypertext documents to said receiving display station, and
    a Web browsing program for said receiving display station including:
        means for querying said search means for hypertext documents,
        means for displaying received hypertext documents having hyperlinks to other documents at said display station,
        means for discounting user selected hyperlinks in a received hypertext document, and
        means for precluding said discounted hyperlinks in any hypertext documents received subsequent to said received hypertext document.

17. The Web network of claim 16 wherein said search means comprise a Web search engine.

18. The Web Network of claim 17 wherein said search means comprise a plurality of search engines, each conducting a separate search.

19. In a Web communication network, a method for precluding repetitive accessing of documents linked to hyperlinks in a plurality of hypertext documents comprising:
    searching the Web to provide hypertext documents to a receiving display station, and
    a Web browsing method for said receiving display station including:
        querying said search means for hypertext documents,
        displaying received hypertext documents having hyperlinks to other documents at said receiving display station, discounting user. selected hyperlinks in a received hypertext document, and precluding said discounted hyperlinks in any hypertext documents received subsequent to said received hypertext document.

20. The method of claim 19 wherein said searching step is carried out by an established Web search method.

21. The method of claim 20 wherein said searching step is carried out by a plurality of established Web search methods, each conducting a separate search.

22. A computer program having code recorded on a computer readable medium for precluding repetitive accessing of documents linked to hyperlinks in a plurality of hypertext documents in a Web communication network comprising:

means for searching the Web to provide hypertext documents to a receiving display station, and a Web browsing program for said receiving display station including:

means for querying said search means for hypertext documents, means for displaying received hypertext documents having hyperlinks to other documents at said receiving display station, means for discounting user selected hyperlinks in a received hypertext document, and means for precluding said discounted hyperlinks in any hypertext documents received subsequent to said received hypertext document.

23. The computer program of claim 22 wherein said search means comprise a Web search engine.

24. The computer program of claim 23 wherein said search means comprise a plurality of search engines, each conducting a separate search.

* * * * *